Dec. 20, 1932.   L. W. NILES ET AL   1,891,287
OIL DRAINING VALVE
Original Filed Nov.5, 1928
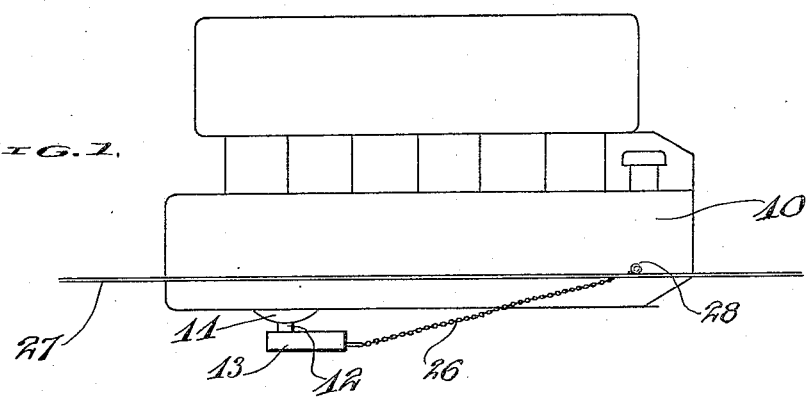
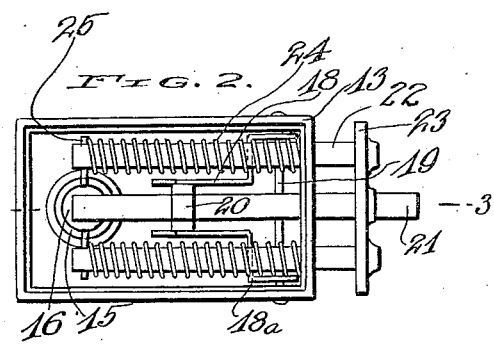
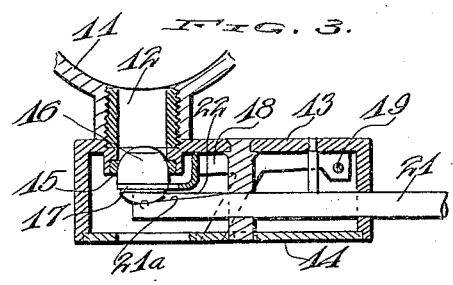
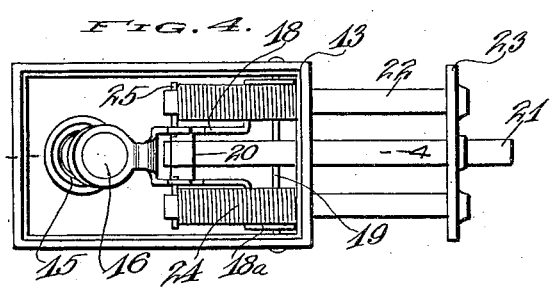
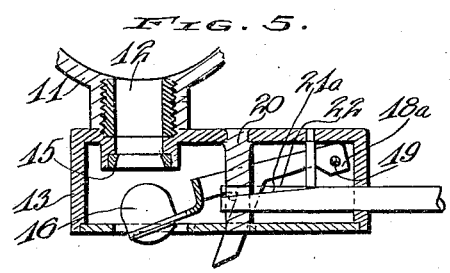
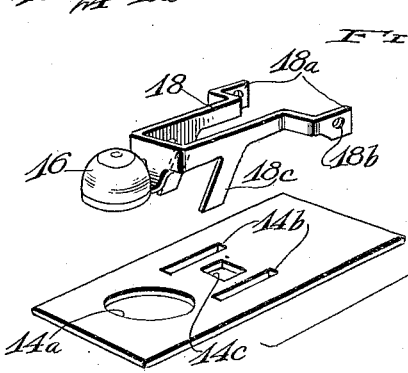
Inventors:-
LOUIS W. NILES
HAROLD F. NILES
By Milot B. Stevens Co.
Attorneys.

Patented Dec. 20, 1932

1,891,287

UNITED STATES PATENT OFFICE

LOUIS W. NILES, OF OAK PARK, AND HAROLD F. NILES, OF RIVER FOREST, ILLINOIS

OIL DRAINING VALVE

Application filed November 5, 1928, Serial No. 317,421. Renewed July 4, 1931.

Our invention relates to valves for the draining of oil from the crank cases of automobile engines, and more particularly to valves of this class which are remotely controlled and our main object is to provide a valve which assures the draining of the oil without any attention other than the operation of the remote manual control.

A further object of the invention is to design the novel valve on the ball principle, and provide the same with a non-metallic seat, whereby to secure a liquid-tight closure.

A still further object of the invention is to operate the valve by a horizontal-movable actuator which lends itself more readily to a pulling action from the remote hand control.

Another object of the invention is to design the actuator for the valve with positive means to open and close the same, whereby to assure either action.

A significant object of the invention is to construct the valve on shallow lines, so that it will not project so much below the engine as to be in the way of objects over which the car passes or parts moved under the car when adjustments or repairs are made.

A final, but nevertheless important object of the invention is to construct the novel valve with a minimum number of sturdy and simple parts which may be assembled at small cost and will operate efficiently for long periods.

With the above objects in view and any others that may suggest themselves from the specification and claims to follow, a better understanding of the invention may be gained by reference to the accompanying drawing, in which—

Figure 1 is an elevation of a typical automobile engine, showing the novel valve and its control applied;

Fig. 2 is a bottom plan view of the valve uncovered and in closed position;

Fig. 3 is a section on the line 3 of Figure 2;

Figs. 4 and 5 are views similar to Figures 2 and 3 showing the valve open the Figure 5 being a section on the line 4 of Figure 4; and Fig. 6 is a group assembly of the main operating parts and the cover for the valve.

Referring specifically to the drawing, 10 denotes a typical engine crank case and 11 the bottom receptacle having the usual nipple 12 of the plug or valve applied for the draining of the crank case oil. In the present instance, we attach a shallow box 13 to the nipple, providing the same with a bottom cover 14. The box 13 is generally of elongated form, and the nipple 12 applies near the front end of the box. The lower end of the nipple is fitted with a composition ring 15 to form a seat for a metal ball valve 16. This valve is carried by the ring portion 17 of a bifurcated lever 18, the arms of this lever extending rearwardly, and expanding as indicated at 18a to lie close to the side walls of the box near the rear end of the latter. The sections 18a are perforated as indicated at 18b to receive a pin 19 passed transversely through the box, this pin forming a pivot for the lever. In the center of the box is a hanger 20 formed with a bearing and a rod 21 extending longitudinally of the box. This rod and two companion rods 22 in parallelism thereto extend slidably out of the rear wall of the box and are connected across by a rigid cross head 23, so as to operate as a unit. The forward end of the rod 21 is beveled from above as indicated at 21a to force upwardly the rounded bottom 16a of the ball valve 16 with a wedging action as the rod slides to its forward limit, forcing the valve to close firmly. The companion rods 22 carry coil springs 24 between the rear wall of the box and cross pins 25 near the front ends of the rods 22. The normal expanding tendency of these springs causes the rod 21 to ordinarily remain in forward position and maintain the valve 16 closed. However, when the rod 21 is drawn rearwardly against the tension of the springs, the inner portions of the pins 25 impinge upon downward spurs 18c of the lever 18 with the effect of depressing the latter and drawing the valve open. The lever is freely pivoted, so that in the event that the valve is not clogged it may of itself fall to open position as soon as the rod 21 is withdrawn from engagement with the bottom of the valve. However, the action of the pins 25 upon the spurs 18c operates to open the valve by positive action, so that the valve cannot fail to open when the rod 21 is drawn rearwardly. The spurs 18c are not directly downward, but rather inclined in forward direction, so that the forward edges of the spurs act as cams to induce the more gradual opening of the valve in response to the pressure of the pins 25.

For convenience of control, the rod 21 receives a chain 26, which extends toward the rear of the car and up through a convenient hole in the engine floor 27 to receive a ring 28 on that side of the engine which has the oil filler, that the latter may be handy for refilling the crank case after the oil has been drained. Thus, the ring 28 may be easily reached by opening the corresponding side of the engine hood, and one need not get under the car to open the drain valve.

It will be seen that the novel drain valve is a sturdy and compact piece of mechanism. First, the action of the valve as induced by the control is positive, and the valve is normally kept closed by the wedging action of the rod 21, which is of an advantageous leverage. Further, but the rod and its bearing are below the valve, and since the rod is horizontally disposed the ball valve may be said to be very shallow and therefore not subject to be struck or impeded by objects under the car. This design enables us to make the box shallow and to provide a simple cover therefor which may be held in place by being sprung into the mouth of the box or by other suitable means. However, in case of damage to the mechanism from the under side or other influence tending to break one of the springs 24, the other will suffice to keep the rod 21 in forward position so as to maintain the valve closed. Also, vibration will have a beneficial, rather than detrimental effect on the valve, as the tendency will be for the rod to creep up or advance on the valve and seat the same more firmly. Yet, should the rod recede momentarily from a shock suffered by it or the chain, the seal of the valve and its seat will keep the valve closed during the emergency.

The ball valve is of brass or other suitable material for this purpose, and makes a hermetical fit with the composition seat 15; and once the ball valve is separated from the seat by the action of the mechanism, the weight of the crank case oil will cause any sediment over the valve to give way and permit passage of the oil for drainage. Here the ball design of the valve is of importance, since the smooth and spherical surface thereof will more readily wash free of sediment as the oil flows past the valve.

It will be further noted that the rods 21 and 22 as well as the parts carried by them move fully clear of the oil draining area when they are actuated, so that the draining of the oil is not impeded in any way and the parts are not clogged by oil. To facilitate the escape of the oil, the cover 14 is cut with a large opening 14a directly below the ball valve; and side slots 14b are provided for the clearance of the lower portions of the lever spurs 18c. Also, a central opening 14c is made in the cover to receive the lower end of the hanger 20 and more accurately fit the cover in the bottom of the box. In conclusion, it may be said that the structure is very compact and simple, requires no special care, and may operate for long periods without more attention than an occasional cleaning.

We claim:—

1. A valve mechanism comprising a conduit having a bottom outlet formed with a seat, a valve for the latter, and a laterally-movable member effective to seat the valve when moved in one direction, a movable support for the valve, a cam element carried by the support, and means carried by said member and effective when the latter is moved in the opposite direction to bear on the cam element whereby to depress the support and unseat the valve.

2. A valve mechanism comprising a conduit having a bottom outlet formed with a seat, a valve for the latter, and a laterally-movable member effective to seat the valve in one direction, a hinged frame carrying the valve, inclined cam spurs projecting from the sides of the frame, and pins carried by said member and effective when the latter is moved in the opposite direction to gradually bear on said cam spurs whereby to depress the support and unseat the valve.

3. A drain valve structure comprising a conduit having a bottom outlet formed with a seat, a relatively shallow casing extended laterally from said outlet, a valve opposite the seat, a valve support hingedly mounted in the casing, and means to operate the valve.

4. A drain valve structure comprising a conduit having a bottom outlet formed with a seat, an elongated casing secured at one end to said outlet, a valve opposite the seat, a valve support hingedly mounted in the casing, and means to operate the valve, said support and means to operate the valve being situated in the other end of the casing.

In testimony whereof we affix our signatures.

LOUIS W. NILES.
HAROLD F. NILES.